UNITED STATES PATENT OFFICE.

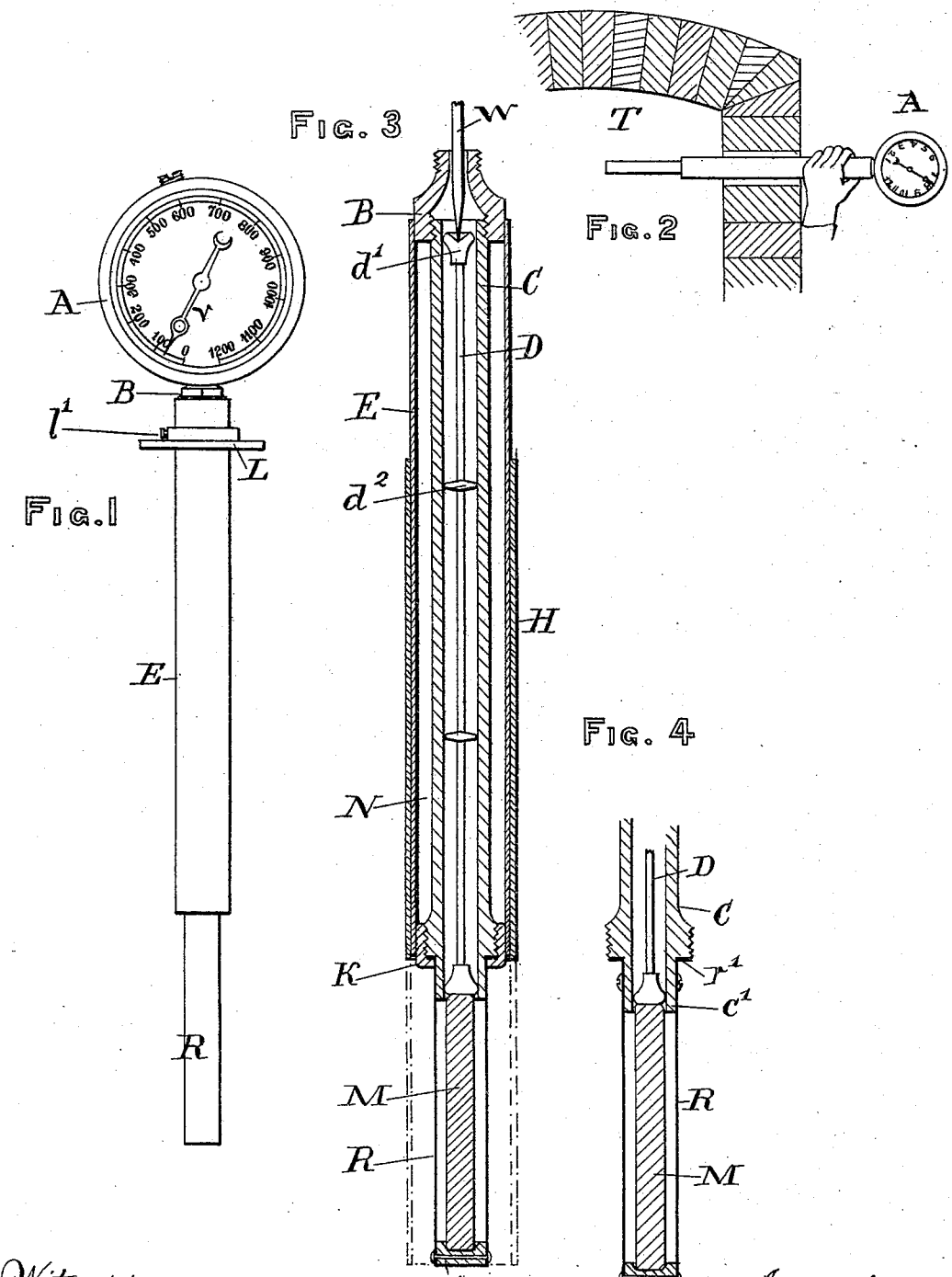

EDWARD BROWN, OF PHILADELPHIA, PENNSYLVANIA.

PYROMETER.

SPECIFICATION forming part of Letters Patent No. 494,244, dated March 28, 1893.

Application filed May 26, 1891. Serial No. 394,180. (No model.)

*To all whom it may concern:*

Be it known that I, EDWARD BROWN, a citizen of the United States, residing at Philadelphia, in the county of Philadelphia and State of Pennsylvania, have invented a new and useful Pyrometer, of which the following is a specification.

My invention relates to the construction of pyrometers which have a long stem projecting into the medium, the temperature of which is to be indicated, which stem is secured to a case containing the multiplying mechanism, pointer and dial. To give sufficient rigidity and strength, this style of stem pyrometer is made with somewhat heavy or thick walls; and especially is this necessary when the pyrometer is employed to indicate the temperature of gases above red heat; a red heat being very destructive in its oxidizing effect upon the metals which are most easily available. The stem in a few weeks or months becomes bent or eaten away, or the structure of the material entirely altered and useless. Again this style of pyrometer is only accurate when the stem as a whole has been inserted in the heated medium a sufficient time to acquire a uniform temperature throughout its parts which takes from ten to twenty minutes, too long a time to be spared by a workman, and consequently the pyrometer is only used as a fixed or stationary pyrometer. For a general description of this style of pyrometer see my patent of December 4, 1888, No. 393,962. In the invention I will now describe, I make this stem pyrometer to indicate accurately in one minute or less the temperature of red hot gases or fluids. This is done by making the stem in two parts; the lower end of very thin sheet metal tubing connected firmly to a much heavier and thicker pipe. Within this composite stem and at the bottom is the non-expanding rod of infusible material and upon this rests a rod of metal which communicates with the indicating mechanism and pointer shown in my patent of December 4, 1888, No. 393,962.

Another feature of this invention is the adjustment of the indicating mechanism so that the pointer, which moves according to the combined expansion of all the parts of the stem, shall show the correct temperature when it arrives at its first maximum or nearly stationary position due to the rapid heating of the thin expansion tube. When in use this thin sheet metal tube is rapidly heated and communicates its expansion to the pointer before the heat has had time to produce much effect in raising the temperature of the other and heavier part of the stem. The instrument can at once be withdrawn after the trial, thus prolonging its durability; and not only is it made more durable but the same metals can thus be used to indicate higher temperatures than heretofore; and metals almost infusible are thus made available for indicating temperatures much above white heat.

In the accompanying drawings Figure 1 is a general view of the pyrometer as a whole. Fig. 2 shows the same inserted by the attendant workman into a heating or annealing oven. Fig. 3. shows a vertical section through the stem. Fig. 4 is especially to show a section through the sheet-iron expansion tube.

Similar letters refer to similar parts.

In Fig. 1. is shown the case or head A having a dial and a pointer V which is actuated by the difference in expansion in the parts of the stem. B is a socket uniting the head to the stem; R the expansion tube, coupled to the lower end of the stem. The stem shown in Fig. 3 is constructed of a heavy pipe C to give strength and rigidity when inserted three or four feet into a red hot furnace. The lower end of this pipe is faced and screwed to fit the coupling K similarly to what is known as a union joint. R is the expansion tube of thin sheet metal as iron or platinum, see Fig. 4. A flange $r'$ is turned on its top edge by which the tube is coupled to the heavy pipe C. When this tube is very thin it is slipped over the reduced end $c'$ of the pipe C as shown and secured by screws, to give additional rigidity to the joint. In the lower end of the expansion tube is fitted the plug $s$. This plug is counter sunk inside, to receive centrally the bar M of plumbago ware firebrick or similar infusible material which has a small expansion or no expansion per degree of heat. Upon this bar rests the brass rod D the upper end of which communicates through the spring pin W with the mechanism in the head A, and any motion due to the difference in expansion of the parts of this composite stem is communicated to the pointer.

In Fig. 2 is shown the instrument as used in a heating oven T, the temperature of which may be white hot. The wall in this case is from eighteen inches to twenty inches thick, and white hot on its inside edge and several hundred degrees Fahrenheit cooler on the outside. To prevent the pipe C being heated or affected by this high temperature of the oven, or wall, I incase it in another tube E and between the two I fill in with asbestus paper N wrapped around the pipe C. To protect the thin expansion tube R when not in use I place outside the tube E, a sliding case H.

The instrument operates in this way: When inserted into gases at a white heat the platinum expansion tube R being very thin, about No. 27 wire gage, acquires the full temperature of the oven in one minute or less, the pointer V indicating the temperature on the dial, quite definitely to a practiced eye. As however some heat is slowly penetrating to the pipe C and being conducted to it at the heavy coupling joint K before the inside rod D can be heated, the pointer still continues to creep up slowly, (when the rod D and pipe C are made of the same material) until the stem is heated all through evenly. That the indication of the pointer may be more definite I make the rod D of brass, or, a material which elongates more per degree of heat than the outside pipe C, and extend the rod below the coupling K so that the heat is communicated more rapidly to the rod D at its lower end.

L is a movable flange adjustable by screws $l'$—this flange serves to close the aperture into the oven or furnace and prevent an influx of cold air. The effect of this construction is such, that the expansion tube R will indicate the temperature due to its elongation in less than one minute, at which time the heat begins to elongate the rod D more than the pipe C, which causes the pointer to recede from its maximum ten or twenty degrees, thus indicating precisely the temperature reached.

What I claim is—

1. In a pyrometer the combination of the heavy pipe C, the thin expansion tube R separable from but secured rigidly thereto, the interior non-expanding bar M, the rod D communicating with the mechanism within the head A, which is adjusted to indicate the correct temperature when the pointer first arrives at a nearly stationary position.

2. In a pyrometer stem the combination of the pipe C, the expansion tube R the coupling K, the non expanding bar M, the rod D, which at its lower end elongates per degree of heat more than the pipe C, and the pin W, to operate the pointer V as herein described.

3. In a pyrometer stem adapted to be inserted in a heated medium, the combination of a heavy tube C protected from the access of heat by the casing E, the thin metal expansion tube R separable from but secured rigidly thereto, the non-expanding bar M and an inside rod for communicating the expansion of the tube R to the pointer.

4. In a pyrometer stem the combination of the pipe C, the metal expansion tube R, flange $r'$, coupling K, the nonexpanding bar M, the rod D, and pin W communicating with the pointer V as herein described.

5. In a pyrometer stem the combination of the pipe C the flanged sheet metal tube R, coupling K, non-expanding bar M, rod D, substantially as described.

EDWD. BROWN.

Witnesses:
E. J. SNYDER,
WM. HEARTFELDER.